US011261318B2

(12) United States Patent
Sawada et al.

(10) Patent No.: US 11,261,318 B2
(45) Date of Patent: Mar. 1, 2022

(54) CELLULOSE-FIBER-DISPERSING POLYOLEFIN RESIN COMPOSITE MATERIAL, PELLET AND FORMED BODY USING SAME, AND PRODUCTION METHOD FOR CELLULOSE-FIBER-DISPERSING POLYOLEFIN RESIN COMPOSITE MATERIAL

(71) Applicant: FURUKAWA ELECTRIC CO., LTD., Tokyo (JP)

(72) Inventors: Yuka Sawada, Tokyo (JP); Hidekazu Hara, Tokyo (JP); Jirou Hiroishi, Tokyo (JP); Masami Tazuke, Tokyo (JP); Toshihiro Suzuki, Tokyo (JP)

(73) Assignee: FURUKAWA ELECTRIC CO., LTD., Tokyo (JP)

( * ) Notice: Subject to any disclaimer, the term of this patent is extended or adjusted under 35 U.S.C. 154(b) by 0 days.

(21) Appl. No.: 16/797,654

(22) Filed: Feb. 21, 2020

(65) Prior Publication Data
US 2020/0190305 A1 Jun. 18, 2020

Related U.S. Application Data

(63) Continuation of application No. PCT/JP2018/031250, filed on Aug. 23, 2018.

(30) Foreign Application Priority Data

Aug. 23, 2017 (JP) .............................. JP2017-160679

(51) Int. Cl.
| | | |
|---|---|---|
| *C08L 23/12* | (2006.01) | |
| *B29B 7/00* | (2006.01) | |
| *B29B 7/16* | (2006.01) | |
| *C08J 3/215* | (2006.01) | |
| *C08L 97/02* | (2006.01) | |
| *B29K 1/00* | (2006.01) | |
| *B29K 23/00* | (2006.01) | |
| *B29K 105/26* | (2006.01) | |

(52) U.S. Cl.
CPC .............. *C08L 23/12* (2013.01); *B29B 7/005* (2013.01); *B29B 7/16* (2013.01); *C08J 3/215* (2013.01); *B29K 2001/00* (2013.01); *B29K 2023/12* (2013.01); *B29K 2105/26* (2013.01); *C08J 2323/12* (2013.01); *C08J 2401/02* (2013.01)

(58) Field of Classification Search
CPC .......... C08L 23/12; C08L 97/02; C08K 23/12
See application file for complete search history.

(56) References Cited

U.S. PATENT DOCUMENTS

| | | | |
|---|---|---|---|
| 2014/0336309 A1 | 11/2014 | Sakata et al. | |
| 2017/0101489 A1* | 4/2017 | Gahleitner | ............. C08K 5/527 |

FOREIGN PATENT DOCUMENTS

| | | |
|---|---|---|
| CN | 105263708 A | 1/2016 |
| EP | 3 441 425 A1 | 2/2019 |
| EP | 3 549 980 A1 | 10/2019 |
| JP | 2004-58254 A | 2/2004 |
| JP | 2007-260941 A | 10/2007 |
| JP | 2011-93990 A | 5/2011 |
| JP | 4680000 B2 | 5/2011 |
| JP | 2011-116838 A | 6/2011 |
| JP | 2011-190322 A | 9/2011 |
| JP | 2011-219571 A | 11/2011 |
| JP | 4846405 B2 | 12/2011 |
| JP | 4950939 B2 | 6/2012 |
| JP | 2013-18916 A | 1/2013 |
| JP | 2017-128716 A | 7/2017 |
| JP | 2017-128717 A | 7/2017 |
| JP | 2017-145392 A | 8/2017 |
| JP | 2017-145393 A | 8/2017 |
| WO | WO 2014/153076 A1 | 9/2014 |
| WO | WO 2018/105173 A1 | 6/2018 |
| WO | WO 2018/105174 A1 | 6/2018 |

OTHER PUBLICATIONS

Data Sheet of Moplen EP500V (Year: 2021).*
El-Sabbagh et al. Proceedings of the Regional Conference Graz 2015—Polymer Processing Society PPS, AIP Conf. Proc. 1779, 060010-1-060010-5.*
Computer-generated English-language translation of JP2004058254A.*
Computer-generated English-language translation of JP2007045863A.*
Computer-generated English-language translation of JP2007260941A.*
Computer-generated English-language translation of JP2011190322A.*
Computer-generated English-language translation of JP2017128717A.*
International Search Report issued in PCT/JP2018/031250 (PCT/ISA/210), dated Nov. 27, 2018.
International Preliminasy Report on Patentability and English Translation of Written Opinion of the International Searching Authority dated Feb. 25, 2020, for PCT/JP2018/031250 (Forms PCT/IB/373 and PCT/ISA/237).

(Continued)

*Primary Examiner* — Vu A Nguyen

(74) *Attorney, Agent, or Firm* — Birch, Stewart, Kolasch & Birch, LLP

(57) ABSTRACT

A cellulose-fiber-dispersing polyolefin resin composite material, containing a polyolefin resin containing a polypropylene resin, and a cellulose fiber dispersed in the polyolefin resin, in which a proportion of the cellulose fiber is 1 mass part or more and 70 mass parts or less in a total content of 100 mass parts of the polyolefin resin and the cellulose fiber, and the polyolefin resin satisfies the expression: $Mz/Mw \geq 4$, which is a ratio of Z-average molecular weight Mz to weight-average molecular weight Mw to be obtained by a gel permeation chromatography measurement;

a pellet or a formed body using this composite material; and a production method for the composite material.

19 Claims, No Drawings

(56) References Cited

OTHER PUBLICATIONS

Extended European Search Report for corresponding European Application No. 18847322.7, dated Apr. 12, 2021.
Japanese Office Action issued in Application No. 2019-5327596, dated Dec. 14, 2021 (with English Translation).
Chinese Office Action, with Search Report, issued in Application No. 201883053610.4 dated Dec. 28, 2021 (with English Translation).

* cited by examiner

CELLULOSE-FIBER-DISPERSING POLYOLEFIN RESIN COMPOSITE MATERIAL, PELLET AND FORMED BODY USING SAME, AND PRODUCTION METHOD FOR CELLULOSE-FIBER-DISPERSING POLYOLEFIN RESIN COMPOSITE MATERIAL

CROSS-REFERENCE TO RELATED APPLICATIONS

This application is a Continuation of PCT International Application No. PCT/JP2018/031250 filed on Aug. 23, 2018, which claims priority under 35 U.S.C. § 119 (a) to Japanese Patent Application No. 2017-160679 filed in Japan on Aug. 23, 2017. Each of the above application is hereby expressly incorporated by reference, in its entirely, into the present application.

TECHNICAL FIELD

The present invention relates to a cellulose-fiber-dispersing polyolefin resin composite material, and to a pellet and a formed body using the same, and a production method for a cellulose-fiber-dispersing polyolefin resin composite material.

BACKGROUND ART

Laminated paper that forms a beverage container made of paper, such as a milk carton, has a polyolefin thin film of polyethylene, polypropylene, or the like adhered on the surface of paper formed mainly from cellulose fibers in order to prevent penetration of beverage into the paper portion, and in order to enhance the gas barrier properties and the like, the laminate paper adopts a laminate structure into which an aluminum thin film layer is incorporated, as necessary. In recycling such laminated paper, it is necessary to perform separation treatment to a paper portion (pulp) and a polyolefin thin film portion (polyolefin thin film piece).

As a method of separation treatment, a method of stripping off a part of the paper portion from the laminated paper by agitating the laminated paper in water for a long time in a device called a pulper is general. The thus-separated paper portion is applied as a raw material of recycled paper.

However, the polyolefin thin film piece is in a state in which a large number of paper components (paper pieces formed of the cellulose fiber) are nonuniformly adhered on the surface thereof, and sizes and shapes are all different, and further the cellulose fiber adhered to the polyolefin thin film piece absorbs a large amount of water upon the separation treatment of the paper by the above-described pulper. If such a polyolefin thin film piece is attempted to be recycled as a raw material for resin products, sufficient drying treatment is required, and a large quantity of energy is consumed for recycle. Also, since the raw materials are not uniform in size and shape, it was difficult to obtain a resin with a homogeneous composition and physical properties by kneading them. Therefore, such a cellulose-fiber-adhering polyolefin thin film piece is directly landfilled and disposed of or recycled as a fuel under actual circumstances.

Therefore, from the viewpoint of reducing the environmental burden, it was desired to develop a technology for recycling the above-mentioned polyolefin thin film piece as a raw material for resin products.

Several technologies relating to recycling of laminated paper or a cellulose-containing resin material have been reported.

Japanese patent No. 4680000 (Patent Literature 1) describes, as a recycling technology on a used beverage container formed of laminated paper, a method in which the laminated paper is directly pulverized into small pieces without separating the paper into a paper portion and a polyethylene thin film portion to produce a paper-containing resin composition by kneading the small pieces together with polypropylene and the like by a twin screw extruder, and further a flow improver is added thereto, and the resulting material is subjected to injection molding.

Moreover, Japanese patent No. 4950939 (Patent Literature 2) discloses a technology on combining a used PPC sheet with a used PET material such as a used beverage container, and the like, and recycling the resulting material, and describes a method in which the PPC sheet is finely cut and water is contained therein, and then the resulting material is kneaded together with a finely cut PET material in the presence of water in a subcritical state to prepare a resin for injection molding.

According to the technology in this Patent Literature 2, a cellulose fiber of the PPC sheet and a melted PET material are easily mixed in a relatively uniform manner by kneading the PPC sheet and the PET material in the presence of water in the subcritical state.

Moreover, it is known that, if the cellulose fibers are uniformly dispersed into the resin, physical properties are improved, for example, flexural strength is improved in comparison with a resin single body, or the like. For example, JP-A-2011-93990 ("JP-A" means unexamined published Japanese patent application) (Patent Literature 3) discloses a technology in which a non-fibrillated fibrous cellulose and a thermoplastic resin are melt kneaded by using a batch type closed kneading device to produce a resin formed body which contains the cellulose fiber and has high strength.

Furthermore, Japanese patent No. 4846405 (Patent Literature 4) describes a method for obtaining a paper-blended resin composition by directly pulverizing laminated paper without separating the laminated paper into a paper portion and a polyethylene thin film portion, forming a cylindrical pellet with a non-screw type granulator, causing this pellet to absorb water, further adding polypropylene, and heating and kneading the mixture with a twin-screw extruder.

CITATION LIST

Patent Literatures

Patent Literature 1: Japanese Patent No. 4680000
Patent Literature 2: Japanese Patent No. 4950939
Patent Literature 3: JP-A-2011-93990
Patent Literature 4: Japanese Patent No. 4846405

SUMMARY OF INVENTION

Technical Problem

According to the technology described in Patent Literature 1, the material is pulverized into a fine particle diameter of 0.5 mm to 2.5 mm without stripping off a paper portion from laminated paper, and polypropylene or modified polypropylene is added thereto, the resulting material is kneaded by a twin screw extruder to obtain a paper-containing resin composition, and further a mixture containing a flow improver is added thereto and injection molding is performed. The technology described in Patent Document 1 does not melt knead the raw material in the presence of water.

Moreover, Patent Literature 2 refers to an invention relating to a production method for a resin for injection molding by allowing water to contain in a PPC sheet being a used discharging paper discharged from an office, and then dewatering the PPC sheet, mixing the resulting material with a PET resin or a PP resin, and performing subcritical or supercritical treatment.

The invention described in Patent Literature 2 is an art of simply preparing PPC waste paper and a container recycle resin such as a PET resin separately, performing a mixing treatment, and recycling the resulting material, and the invention is not intended to achieve recycling by directly using laminated paper having paper and a polyolefin thin film adhered together, a thin film piece in a state in which paper is attached to a polyolefin thin film, or the like.

In the technology described in Patent Literature 2, a large number of cellulose fibers composing the PPC sheet are complicatedly entangled, and it is difficult to sufficiently defibrate the fibers into a loose state. Therefore, a material obtained by finely cutting the PPC sheet is used.

Moreover, water absorption from a cut surface is dominant in the PPC sheet. Therefore, unless the PPC sheet is finely cut and water-containing and dewatering treatments are performed in order to increase a surface area of the cut surface, defibration of the cellulose fiber by the subcritical or supercritical treatment does not sufficiently progress. When this cutting is not sufficiently performed, unfibrated paper pieces (aggregate of cellulose fibers) remain in the produced resin for injection molding in no small part, and there is a problem which may cause reduction of strength of the resin for injection molding and reduction of water absorption characteristics.

Further, in the technology described in Patent Literature 3, in charging a thermoplastic resin and fibrous cellulose as a separate material into an agitation chamber of a batch type melt-kneading device to melt knead the thermoplastic resin and the fibrous cellulose, while the fibrous cellulose is not melted, the thermoplastic resin is melted. That is, in the technology described in Patent Literature 3, the raw material to be used is a so-called pure article suitable for obtaining an objective resin composition, and the technology is not intended to achieve recycling of laminated paper having paper and a polyolefin thin film adhered together, a thin film piece in a state in which paper is attached to a polyolefin thin film, or the like.

Moreover, when the thermoplastic resin and the fibrous cellulose which are different in physical properties are separately charged thereinto and mixed therein, it is difficult to form an integrated resin composition in which the fibrous cellulose is dispersed into the thermoplastic resin in a sufficiently uniform state. That is, an aggregate of fibrous cellulose is easily produced, and strength of a resin formed body is liable to be reduced. Therefore, Patent Literature 3 describes use of the fibrous cellulose having an aspect ratio of 5 to 500.

Furthermore, in the technology described in Patent Literature 4, a paper-containing resin composition is obtained by pulverizing laminated paper without stripping off a paper portion, pelletizing the resulting material with a non-screw type granulator, causing the pellet to absorb water, adding polypropylene thereto, and kneading the mixture with a twin-screw extruder. However, in Patent Literature 4, there is no specific description on the uniform dispersibility of cellulose fibers in the resulting resin composition or the physical properties of the resin composition (usefulness as a forming material).

The present invention provides a cellulose-fiber-dispersing polyolefin resin composite material that has a particular amount of cellulose fibers dispersed in a sufficiently uniform state in a polyolefin resin, has excellent flowability in a heated and softened state and excellent moldability for injection molding, and is useful as a raw material for a resin product having excellent mechanical strength such as tensile strength and impact resistance; and a pellet and a formed body using this composite material. Furthermore, the present invention provides a method for producing a cellulose-fiber-dispersing polyolefin resin composite material, which is suitable for obtaining this cellulose-fiber-dispersing polyolefin resin composite material.

Solution to Problem

The present inventors found that when a polyolefin laminated paper having paper and a polyolefin thin film layer, a beverage/food pack formed from this polyolefin laminated paper, and/or a polyolefin thin film piece in a state of having cellulose fibers adhered thereto, which is obtainable by treating the above-mentioned materials with a pulper, is mixed with a polypropylene resin, and then the mixture is melt-kneaded under particular conditions in the presence of water using a batch type closed kneading device having a stirring blade, a composite material having suitable physical properties as a raw material for a resin product having predetermined molecular weight distribution characteristics, in which cellulose fibers are sufficiently uniformly dispersed and integrated in the polyolefin resin while moisture is removed, can be obtained. Furthermore, the present inventors found that a similar composite material can also be obtained, not by incorporating a polypropylene resin during the melt-kneading, but by incorporating a polypropylene resin after melt-kneading and performing kneading.

The present inventors continued to conduct further examination based on these findings, and have completed the present invention.

That is, the above-described problems of the present invention are solved by the following means.

[1]

A cellulose-fiber-dispersing polyolefin resin composite material, containing:

a polyolefin resin containing a polypropylene resin; and a cellulose fiber dispersed in the polyolefin resin, wherein a proportion of the cellulose fiber is 1 mass part or more and 70 mass parts or less in a total content of 100 mass parts of the polyolefin resin and the cellulose fiber, and wherein the polyolefin resin satisfies the expression: $Mz/Mw \geq 4$, which is a ratio of Z-average molecular weight $Mz$ to weight-average molecular weight $Mw$ to be obtained by a gel permeation chromatography measurement.

[2]

The cellulose-fiber-dispersing polyolefin resin composite material described in the above item [1], wherein the weight average molecular weight $Mw$ is in the range of 400,000 or more.

[3]

The cellulose-fiber-dispersing polyolefin resin composite material described in the above item [1] or [2], wherein a melt flow rate (MFR) at a temperature of 230° C. and a load of 5 kgf is 0.05 to 50.0 g/10 min.

[4]

The cellulose-fiber-dispersing polyolefin resin composite material described in any one of the above items [1] to [3], wherein a proportion of the cellulose fiber is 5 mass parts or more and less than 50 mass parts in a total content of 100 mass parts of the polyolefin resin and the cellulose fiber.

[5]

The cellulose-fiber-dispersing polyolefin resin composite material described in any one of the above items [1] to [4], containing aluminum dispersed in the polyolefin resin, wherein a content of the aluminum is 1 mass part or more and 40 mass parts or less based on a total content of 100 mass parts of the polyolefin resin and the cellulose fiber.

[6]

The cellulose-fiber-dispersing polyolefin resin composite material described in the above item [5], wherein a proportion of the number of aluminum having an X-Y maximum length of 1 mm or more in the number of aluminum having an X-Y maximum length of 0.005 mm or more is less than 1%.

[7]

The cellulose-fiber-dispersing polyolefin resin composite material described in any one of the above items [1] to [6], wherein a proportion of the cellulose fiber is 25 mass parts or more and less than 50 mass parts in a total content of 100 mass parts of the polyolefin resin and the cellulose fiber, and tensile strength of a formed body upon forming the composite material is 30 MPa or more.

[8]

The cellulose-fiber-dispersing polyolefin resin composite material described in any one of the above items [1] to [7], containing a cellulose fiber having a fiber length of 1 mm or more.

[9]

The cellulose-fiber-dispersing polyolefin resin composite material described in any one of the above items [1] to [8], wherein a proportion occupied by the polypropylene resin in the polyolefin resin is 50 mass % or more.

[10]

The cellulose-fiber-dispersing polyolefin resin composite material described in any one of the above items [1] to [9], wherein the cellulose-fiber-dispersing polyolefin resin composite material contains an inorganic material, and a content of the inorganic material is 1 mass part or more and 100 mass parts or less based on 100 mass parts of the polyolefin resin.

[11]

The cellulose-fiber-dispersing polyolefin resin composite material described in any one of the above items [1] to [10], wherein, in the cellulose-fiber-dispersing polyolefin resin composite material, water absorption ratio after the cellulose-fiber-dispersing polyolefin resin composite material is immersed into water at 23° C. for 20 days is 0.1 to 10%, and impact resistance after the cellulose-fiber-dispersing polyolefin resin composite material is immersed into water at 23° C. for 20 days is higher than impact resistance before the cellulose-fiber-dispersing polyolefin resin composite material is immersed thereinto.

[12]

The cellulose-fiber-dispersing polyolefin resin composite material described in any one of the above items [1] to [11], wherein a linear expansion coefficient is $5 \times 10^{-5}$ or less.

[13]

The cellulose-fiber-dispersing polyolefin resin composite material described in any one of the above items [1] to [12], wherein a moisture content is less than 1 mass %.

[14] A pellet or a formed body, which is produced by using the cellulose-fiber-dispersing polyolefin resin composite material described in any one of the above items [1] to [13].

[15] A production method for a cellulose-fiber-dispersing polyolefin resin composite material, containing any of the following steps (I) to (V);

(I) melt-kneading a cellulose-fiber-adhering polyolefin thin film piece in the presence of water, subsequently mixing this melt-kneaded product with a polypropylene resin, and kneading the mixture, with the proviso that, in the cellulose-fiber-adhering polyolefin thin film piece, the amount of the cellulose fiber is smaller than the amount of the polyolefin resin as an average of the dry mass ratio;

(II) mixing a cellulose-fiber-adhering polyolefin thin film piece and a polypropylene resin, and melt-kneading the mixture in the presence of water, with the proviso that, in the cellulose-fiber-adhering polyolefin thin film piece, the amount of the cellulose fiber is smaller than the amount of the polyolefin resin as an average of the dry mass ratio;

(III) melt-kneading a polyolefin laminated paper and/or a beverage/food pack formed from this polyolefin laminated paper in the presence of water, subsequently mixing this melt-kneaded product with a polypropylene resin, and kneading the mixture;

(IV) mixing a polyolefin laminated paper and/or a beverage/food pack formed from this polyolefin laminated paper with a polypropylene resin, and melt-kneading the mixture in the presence of water; and (V) mixing a cellulose material with a polypropylene resin, and melt-kneading the mixture in the presence of water;

wherein the melt-kneading in the steps (I) to (V) is carried out using a batch type closed kneading device having a stirring blade while satisfying the following condition (i) and/or condition (ii):

(i) the highest end-point temperature of melt-kneading is 280° C. or lower; and (ii) the ratio of the Z average molecular weight Mz with respect to the weight average molecular weight Mw of the resulting composite material satisfies the expression: $Mz/Mw \geq 4$.

[16]

The production method for a cellulose-fiber-dispersing polyolefin resin composite material described in the above item [15], wherein the cellulose-fiber-adhering polyolefin thin film piece is a polyolefin thin film piece formed by cellulose fibers and aluminum adhering thereto, and the polyolefin laminated paper has an aluminum thin film layer.

[17]

The production method for a cellulose-fiber-dispersing polyolefin resin composite material described in the above item [15] or [16], wherein the melt kneading in the steps (I) to (V) is performed in the presence of water in a subcritical state.

[18]

The production method for a cellulose-fiber-dispersing polyolefin resin composite material described in any one of the above items [15] to [17], wherein the melt kneading in the steps (I) to (IV) is performed by mixing a cellulose material.

[19]

The production method for a cellulose-fiber-dispersing polyolefin resin composite material described in any one of the above items [15] to [18], wherein the cellulose-fiber-dispersing polyolefin resin composite material contains aluminum dispersed therein, and wherein, in the cellulose-fiber-dispersing polyolefin resin composite material, a proportion of the number of aluminum having an X-Y maximum length of 1 mm or more in the number of aluminum having an X-Y maximum length of 0.005 mm or more is less than 1%.

In the present specification, the numerical range expressed by using the expression "to" means a range including numerical values before and after the expression "to" as the lower limit and the upper limit.

The cellulose-fiber-dispersing polyolefin resin composite material of the present invention is a composite material in which at least a cellulose fiber is dispersed in a polyolefin resin containing a polypropylene resin, and a predetermined amount of aluminum or an inorganic material is allowed to be contained as required.

Advantageous Effects of Invention

The cellulose-fiber-dispersing polyolefin resin composite material and the pellet of present invention have excellent flowability in a heated and softened state and excellent moldability for injection molding, and are useful as a raw material for a resin product having excellent mechanical strength such as tensile strength and impact resistance. The formed body of the present invention prepared by using the cellulose-fiber-dispersing polyolefin resin composite material has excellent mechanical strength such as tensile strength and impact resistance, and is useful as a resin product.

According to the method for producing the cellulose-fiber-dispersing polyolefin resin composite material of the present invention, a composite material formed by dispersing a particular amount of cellulose fibers in a polyolefin resin, the composite material having a predetermined molecular weight distribution and being useful as a raw material for a resin product, can be obtained.

MODE FOR CARRYING OUT THE INVENTION

Hereinafter, preferable embodiments of the present invention will be described in detail.
[Cellulose-Fiber-Dispersing Polyolefin Resin Composite Material]

The cellulose-fiber-dispersing polyolefin resin composite material of the present invention (hereinafter, also referred to simply as "composite material of the present invention") is formed by dispersing the cellulose fiber into the polyolefin resin containing a polypropylene (PP) resin, in which the polyolefin resin satisfies the expression: $Mz/Mw \geq 4$, which is a ratio of Z-average molecular weight Mz to weight-average molecular weight Mw to be obtained by a gel permeation chromatography measurement.

In the composite material of the present invention, the cellulose fiber is dispersed in the polyolefin resin in a sufficiently uniform state, and adaptability to extrusion molding, injection molding and the like is high.

As described above, the polyolefin resin composing the composite material of the present invention satisfies the relationship: $Mz/Mw \geq 4$ in the molecular weight pattern to be obtained by the GPC measurement. Thus, while ensuring flowability and injection moldability of the composite material, mechanical strength and impact resistance can be further improved. The polyolefin resin composing the composite material of the present invention satisfies an expression of more preferably $6 \geq Mz/Mw \geq 4$, and further preferably $5 \geq Mz/Mw \geq 4$.

The molecular weight pattern of such a polyolefin resin is realized by achieving molecular weight reduction of a portion of the polyolefin resin by, as will be described below, mixing various raw materials of the composite material of the present invention in the presence of water, and melt-kneading the mixture under particular conditions using a batch type closed kneading device having a stirring blade.

In the composite material of the present invention, the polyolefin resin composing the composite material preferably has a molecular weight at which a maximum peak value is exhibited in the range of 10,000 to 1,000,000 in the molecular weight pattern to be obtained by a gel permeation chromatography measurement. Further, it is preferable that Mw of the polyolefin resin composing the composite material is exhibited in the range of 100,000 to 1,000,000. Impact characteristics tend to be further enhanced by adjusting the molecular weight at which the maximum peak value is exhibited to 10,000 or more and adjusting the Mw to 100,000 or more. Moreover, flowability can be secured by adjusting the molecular weight at which the maximum peak value is exhibited to 1,000,000 or less and adjusting the Mw to 1,000,000 or less.

The Mw of the polyolefin resin composing the composite material is more preferably 300,000 or more, and further preferably 400,000 or more from the viewpoint of the strength and the impact characteristics.

In the composite material of the present invention, water absorption ratio preferably satisfies the following expression. If the water absorption ratio is excessively high, mechanical characteristics such as flexural strength tend to be reduced. If a cellulose effective mass ratio mentioned later is in the range of 5 to 40%, such a case is further preferable. In addition, "water absorption ratio" (unit: %) means the water absorption ratio upon immersing, into water at 23° C. for 20 days, a formed body having a length of 100 mm, a width of 100 mm and a thickness of 1 mm molded using the composite material, which is measured according to the method described in Examples mentioned later.

(Water absorption ratio[%])<(cellulose effective mass ratio)$^2$×0.01 [Expression]:

Here, the cellulose effective mass ratio can be determined by performing a thermogravimetric analysis (TGA) from 23° C. to 400° C. at a heating rate of +10° C./min under a nitrogen atmosphere on a sample of a cellulose-fiber-dispersing polyolefin resin composite material adjusted to a dry state by drying the sample at 80° C. for one hour in an ambient atmosphere in advance, and by calculating the cellulose effective mass ratio according to the following formula.

(Cellulose effective mass ratio [%])=(loss of mass [mg] of a composite material sample from 270° C. to 390° C.)×100/(mass [mg] of a composite material sample in a dry state before being provided for the thermogravimetric analysis)

In the composite material of the present invention, even though the composite material contains the cellulose fiber having high water absorbing properties, an increase of the water absorption ratio is suppressed in this composite material. This reason is not certain, but it is assumed that the water absorbing properties of the cellulose fiber are effectively masked by the polyolefin resin in such a manner that the cellulose fiber and the polyolefin resin are formed into a so-called integrated state by a form formed by uniformly dispersing the cellulose fiber into the polyolefin resin. Moreover, in order to uniformly disperse the cellulose fiber into the polyolefin resin, it is necessary to perform melt-kneading of the thin film piece in the presence of water as mentioned later under specific conditions. It is also considered, as one contributory factor of suppressing the water absorbing properties, that a part of the polyolefin resin is decomposed into low-molecular weight components in this melt-kneading, a hydrophilic group is formed on the surface thereof, and this hydrophilic group is bonded with a hydrophilic group on the surface of the cellulose fiber, resulting in reducing the hydrophilic group on the surface thereof, or that the cellulose is decomposed by action of hot water or water in a subcritical state in the melt-kneading, and the hydrophilic group is reduced, or the like.

In the composite material of the present invention, a proportion of the cellulose fiber in a total content of 100 mass parts of the polyolefin resin and the cellulose fiber is adjusted to be 70 mass parts or less. The cellulose fiber can be further uniformly dispersed by melt kneading thereinto by adjusting the proportion to 70 mass parts or less in preparation of this composite material, and water absorbing properties of the composite material to be obtained can be further suppressed. From viewpoints of further suppressing the water absorbing properties and further enhancing the impact resistance mentioned later, a proportion of the cellulose fiber in the total content of 100 mass parts of the polyolefin resin and the cellulose fiber is preferably less than 50 mass parts.

Further, in the composite material of the present invention, the proportion of the cellulose fiber in the total content of 100 mass parts of the polyolefin resin and the cellulose fiber is 1 mass part or more. The mechanical strength such as the flexural strength can be further improved by adjusting the proportion to 1 mass part or more. From this viewpoint, a proportion of the cellulose fiber in the total content of 100 mass parts of the polyolefin resin and the cellulose fiber is further preferably 5 mass parts or more, and still further preferably 15 mass parts or more. Moreover, if a point of further improving tensile strength is taken into consideration, the proportion is preferably 25 mass parts or more.

The content (%) of the polyolefin resin in the composite material of the present invention can be obtained from the following formula as the soluble mass ratio to hot xylene Ga (%).

$$Ga[\%] = \{(W0 - Wa)/W0\} \times 100$$

W0: dry mass of a composite material before being immersed into hot xylene
Wa: mass of a composite material after being immersed into hot xylene at 138° C. and then drying and removing xylene According to the present invention, the content of the cellulose fiber in the composite material is dependent on the cellulose effective mass ratio described above. That is, the proportion A (mass parts) occupied by the cellulose fiber and the proportion B (mass parts) occupied by the polyolefin resin in a total content of 100 mass parts of the polyolefin resin and the cellulose fiber are expressed as follows, based on the cellulose effective mass ratio (%) expressed in percentage and the above-mentioned content (%) of the polyolefin resin expressed in percentage.

Proportion A occupied by the cellulose fiber in a total content of 100 mass parts of the polyolefin resin and the cellulose fiber (mass part(s))={cellulose effective mass ratio (%)/(cellulose effective mass ratio (%)+content of polyolefin resin (%))}×100

Proportion B occupied by the polyolefin resin in a total content of 100 mass parts of the polyolefin resin and the cellulose fiber (mass part(s))={content of polyolefin resin (%)/(cellulose effective mass ratio (%)+content of polyolefin resin (%))}×100

Here, in a case where the composite material is composed of a polyolefin resin, cellulose fibers, and another component such as aluminum, the content (%) of the other component such as aluminum in the composite material is expressed as follows.

Content of other components such as aluminum (%)=100−{(cellulose effective mass ratio (%)+content of polyolefin resin (%)}

The amount (mass part(s)) of other components such as aluminum in a total content of 100 mass parts of the polyolefin resin and the cellulose fiber is expressed by the following formula.

Amount of other components such as aluminum (mass part(s))=[Content of other components such as aluminum (%)/{(cellulose effective mass (%)+content of polyolefin resin (%)}]×100

When the composite material does not contain any component other than cellulose fibers, polyethylene, and aluminum, or if contains, only to a negligible extent, the content (%) of aluminum in the composite material is expressed as follows.

Content of aluminum (%)=100−{(cellulose effective mass ratio (%)+content of polyolefin resin (%)}

The amount (mass part(s)) of aluminum in a total content of 100 mass parts of the polyolefin resin and the cellulose fiber is expressed by the following formula.

Amount of aluminum (mass part(s))=[Content of aluminum (%)/{(cellulose effective mass ratio (%)+content of polyolefin resin (%)}]×100

It is also preferable that the composite material of the present invention is an embodiment in which aluminum is dispersed, in addition to the cellulose, in the polyolefin resin. This aluminum (hereinafter, also referred to as aluminum dispersoid) can be derived from an aluminum thin film layer that can compose a beverage container. That is, in a case where a beverage/food pack in the form of a laminate having paper, a polyolefin thin film layer, and an aluminum thin film layer is used as a raw material, a certain amount of aluminum is included in the resulting composite material.

In the aluminum thin film layer of the polyethylene laminated paper, aluminum is not melted during the melt-kneading, but is gradually sheared and micronized by shear force during kneading.

When the composite material of the present invention contains aluminum dispersoids, a content of aluminum is preferably 1 mass part or more and 40 mass parts or less based on the total content of 100 mass parts of the polyolefin resin and the cellulose fiber. Processability of the composite material can be further improved by adjusting the content of aluminum to a level within this range, and a lump of aluminum becomes harder to be formed during processing of the composite material.

In addition to the viewpoint of the above-described processability, when thermal conductivity, flame resistance and the like are taken into consideration, in the composite material of the present invention, the content of aluminum is preferably 5 mass parts or more and 30 mass parts or less, and further preferably 5 mass parts or more and 10 mass parts or less, based on the total content of 100 mass parts of the polyolefin resin and the cellulose fiber.

When the composite material of the present invention contains aluminum dispersoids, the aluminum dispersoids preferably contain aluminum dispersoids having an X-Y maximum length of 0.005 mm or more. A proportion of the number of aluminum dispersoids having an X-Y maximum length of 1 mm or more in the number of aluminum dispersoids having an X-Y maximum length of individual aluminum dispersoids of 0.005 mm or more is preferably less than 1%. Processability of the composite material can be further improved, and the lump of aluminum becomes harder to be formed during processing of the composite material by adjusting this proportion to a level less than 1%.

The X-Y maximum length is determined by observing the surface of the composite material. In this observation surface, a longer length of an X-axis maximum length and an Y-axis maximum length is taken as the X-Y maximum length by drawing a straight line in a specific direction (X-axis direction) relative to the aluminum dispersoid to measure the maximum distance (X-axis maximum length) in which a distance connecting lines between two intersection points where the straight line intersects with an outer periphery of the aluminum dispersoid becomes maximum, and drawing another straight line in a direction (Y-axis direction) perpendicular to the specific direction to measure the maximum distance (Y-axis maximum length) connecting lines between the two intersection points where the Y-axis direction line intersects with the outer periphery of the aluminum dispersoid becomes maximum. The X-Y maximum length can be determined using image analysis software as described in Examples mentioned later.

In the aluminum dispersoid dispersed in the composite material of the present invention, an average of the X-Y maximum length is preferably 0.02 to 0.2 mm, and more preferably 0.04 to 0.1 mm. The average of the X-Y maximum length is taken as the average of the X-Y maximum length measured by using the image analysis software as mentioned later.

The polyolefin resin composing the composite material of the present invention preferably contains a polyethylene resin and a polypropylene resin as the polyolefin resin.

This polyethylene is low density polyethylene and/or high density polyethylene (HDPE). The proportion of the low-density polyethylene in the polyethylene resin is preferably 50 mass % or more, and more preferably 80 mass % or more. The above-described low density polyethylene means polyethylene having a density of 880 kg/m$^3$ or more and less than 940 kg/m$^3$. The above-described high density polyethylene means polyethylene having a density larger than the density of the above-described low density polyethylene.

The low density polyethylene may be so-called "low density polyethylene" and "ultralow density polyethylene" each having long chain branching, or linear low density polyethylene (LLDPE) in which ethylene and a small amount of α-olefin monomer are copolymerized, or further may be "ethylene-α-olefin copolymer elastomer" involved in the above-described density range.

Furthermore, it is preferable that the polypropylene resin is a main component of the polyolefin resin composing the composite material, and the proportion occupied by the polypropylene resin in the polyolefin resin composing the composite material is preferably 50 mass % or more, and more preferably 70 mass % or more, from the viewpoint of the mechanical strength of the composite material, such as tensile strength, flexural strength, and flexural modulus.

Furthermore, the total proportion occupied by the polyethylene resin and the polypropylene resin in the polyolefin resin composing the composite material is preferably 70 mass % or more, more preferably 90 mass % or more, and further preferably 95 mass % or more, from the viewpoint of the mechanical strength of the composite material, such as tensile strength, flexural strength, and flexural modulus. It is also preferable that the polyolefin resin is composed of the polyethylene resin and the polypropylene resin. In a case where the polyolefin resin composing the composite material includes a polyolefin resin other than the polyethylene resin and other than the polypropylene resin, examples of this polyolefin resin include a copolymer of ethylene and an α-olefin, an ethylene-vinyl acetate copolymer, an ethylene-acrylic acid copolymer, an ethylene-propylene copolymer, and polybutene.

In the composite material of the present invention, a proportion of the polyethylene resin is 30 mass parts or less in a total content of 100 mass parts of the polyolefin resin and the cellulose fiber Moreover, the composite material of the present invention may contain polyethylene terephthalate and/or nylon, for example. In this case, it is preferable that the composite material contains polyethylene terephthalate and/or nylon, and a total content of polyethylene terephthalate and/or nylon is 10 mass parts or less based on the total content of 100 mass parts of the polyolefin resin and the cellulose fiber. Here, the "total content of polyethylene terephthalate and/or nylon" means a content of one kind when the composite material contains either polyethylene terephthalate or nylon, or means a total content of polyethylene terephthalate and nylon when the composite material contains both polyethylene terephthalate and nylon.

When a kind of the resin that may be mixed into the composite material is known, an amount of each resin can be determined based on a soluble mass ratio to hot xylene for the composite material.

Soluble Mass Ratio to Hot Xylene

The soluble mass ratio to hot xylene is determined as described below in the present invention.

In accordance with measurement of a degree of cross-linking in JASO D 618 as the standard for automotive electrical cables, 0.1 to 1 g is cut out from a molded sheet of the composite material and taken as a sample, and this sample is wrapped with a 400-mesh stainless steel mesh, and immersed into 100 mL of xylene at a predetermined temperature for 24 hours. Next, the sample is pulled up therefrom and is dried in vacuum at 80° C. for 24 hours. From the mass of the sample before and after the test, the soluble mass ratio to hot xylene G (%) is calculated according to the following formula:

$$G=\{(W0-W)/W0\}\times 100$$

where,

W0 is mass of a dry composite material before being immersed into hot xylene, and W is mass of a composite material after being immersed into hot xylene and then drying and removing xylene.

For example, a case where the polyolefin resin composing the composite material is composed of the polyethylene resin and the polypropylene resin is assumed. When a soluble mass ratio to hot xylene of 138° C. for the composite material is taken as Ga (%), a soluble mass ratio to hot xylene of 105° C. for the composite material is taken as Gb (%), and an cellulose effective mass ratio is taken as Gc (%), a term: Ga corresponds to a mass ratio (%) of the polyolefin, Ga−Gb corresponds to a mass ratio (%) of the polypropylene and Gb corresponds to a mass ratio (%) of the polyethylene.

That is, the amount of the polyolefin in the composite material can be determined as the soluble mass ratio to hot xylene of 138° C. Ga (%).

Herein, $$Ga=\{(W0-Wa)/W0\}\times 100$$

$$Gb=\{(W0-Wb)/W0\}\times 100$$

where,

W0 is mass of a dry composite material before being immersed into hot xylene,

Wa is mass of a composite material after being immersed into hot xylene of 138° C. and then drying and removing xylene, and Wb is mass of a composite material after being immersed into hot xylene of 105° C. and then drying and removing xylene, $$Gc=\{Wc/W00\}\times100$$

where,

Wc is an amount of mass reduction of a dry composite material while a temperature is raised from 270° C. to 390° C. in a nitrogen atmosphere, and W00 is mass of a dry composite material before a temperature is raised (at 23° C.) as described above.

Therefore, for example, in a case where the polyolefin resin composing the composite material is composed of the polyethylene resin and the polypropylene resin, and the content of the polypropylene is 30 mass parts or more with respect to a total content of 100 mass parts of the polyolefin resin and the cellulose fiber, the composite material satisfies the following formula.

$$\{(Ga-Gb)/(Ga+Gc)\}\times100\geq30$$

The cellulose fiber contained in the composite material of the present invention preferably contains a material having a fiber length of 1 mm or more. Mechanical strength such as the tensile strength and the flexural strength can be further improved by containing the cellulose fiber having the fiber length of 1 mm or more.

In the composite material of the present invention, it is preferable that the proportion of the cellulose fiber is 25 mass parts or more and less than 50 mass parts in the total content of 100 mass parts of the polyolefin resin and the cellulose fiber, and the tensile strength is 30 MPa or more.

In the composite material of the present invention, a moisture content is preferably less than 1 mass %. As mentioned later, the composite material of the present invention can be produced by the melt-kneading a resin-containing raw material in the presence of water under specific conditions. According to this method, water can be effectively removed as vapor while performing the melt-kneading, and the moisture content of the composite material obtained can be reduced to a level less than 1 mass %. Accordingly, in comparison with a case where removal of the moisture and the melt-kneading are performed as different processes, energy consumption (power consumption or the like) required for the removal of the moisture can be significantly suppressed.

In the composite material of the present invention, the water absorption ratio after the composite material is immersed into water of 23° C. for 20 days is preferably 0.1 to 10%. In the composite material of the present invention, an increase of the water absorption ratio can normally be suppressed as mentioned above. Moreover, when a small amount of water is absorbed therein, the composite material preferably has physical properties of enhanced impact resistance without causing significant reduction of the flexural strength. The formed body using the composite material of the present invention can be preferably used also in outdoor use by having such physical properties.

The water absorbing properties and the impact resistance of the composite material can be measured by forming the composite material into a specific shape. More specifically, the water absorbing properties and the impact resistance are measured by the method described in Examples to be mentioned later.

In the composite material of the present invention, a melt flow rate (MFR) at a temperature of 230° C. and a load of 5 kgf is preferably 0.05 to 50.0 g/10 min. Further satisfactory moldability can be realized, and the impact resistance of the formed body obtained can be further enhanced by adjusting MFR in the above-described preferable range.

The composite material of the present invention can be processed into a pellet by melting and solidifying the composite material into an arbitrary shape and size or cutting the composite material. For example, the pellet can be obtained by extruding a pulverized material of the composite material of the present invention into a strand form by a twin screw extruder, cooling and solidifying the strand, and then cutting the resulting material. Alternatively, the pellet can be obtained by extruding the pulverized material of the composite material of the present invention and cutting the resulting material by a twin screw extruder provided with hot cutting. The size and the shape of these pellets are not particularly limited, and can be appropriately selected according to the purpose. For example, the pellet can be finished into a substantially column-shaped or disc-shaped grain having a diameter of several millimeters.

At least a part of the above-described polyolefin resin, such as the polyethylene resin and the polypropylene resin, composing the composite material of the present invention is preferably derived from a recycled material. Specific examples of this recycled material include a polyolefin laminated paper having paper and a polyolefin thin film layer; a polyolefin laminated paper having paper, a polyolefin thin film layer and an aluminum thin film layer; and a beverage/food pack each formed of any of the polyolefin laminated paper as described above.

Furthermore, it is also preferable to use, as a raw material, a polyolefin thin film piece formed by adhering cellulose fibers (hereinafter, also referred to as "cellulose-fiber-adhering polyolefin thin film piece". This "cellulose-fiber-adhering polyolefin thin film piece" is used to mean to include a polyolefin thin film piece formed by cellulose fibers and aluminum adhering thereto, in addition to a polyolefin thin film piece to which cellulose fibers are adhered and aluminum is not adhered), which is obtained by treating these processed paper with a pulper and stripping off the paper portion. In general treatment by using the pulper, the cellulose-fiber-adhering polyolefin thin film piece obtained ordinarily has a smaller amount of the cellulose fiber than the amount of the polyolefin resin in the dry mass, in the case where the thin film piece is an aggregate of the thin film piece (thin film piece raw material as a whole).

The composite material of the present invention may contain an inorganic material. Flexural modulus and flame retardancy may be improved by containing the inorganic material. From viewpoints of the flexural modulus and the impact characteristics, a preferable content of the inorganic material based on 100 mass parts of the polyolefin resin is 1 to 100 mass parts. When the flame retardancy is taken into consideration, and the further improvement of impact characteristics are further taken into consideration, a preferable content of the inorganic material based on 100 mass parts of the polyolefin resin is preferably 5 to 40 mass parts.

Specific examples of the inorganic material include calcium carbonate, talc, clay, magnesium oxide, aluminum hydroxide, magnesium hydroxide and titanium oxide. Above all, calcium carbonate is preferable.

The composite material of the present invention may contain a fibrous material other than the cellulose fiber. Examples of the fibrous material other than the cellulose fiber include a glass fiber, a ceramics fiber, a carbon fiber, and a resin fiber other than the cellulose fiber. Examples of the resin fiber other than the cellulose fiber include an aramid fiber, and a poly(p-phenylenebenzobisoxazole) (PBO) fiber. Preferred examples of the glass fiber include a chopped strand and a milled fiber.

The composite material of the present invention may contain a flame retardant, an antioxidant, a stabilizer, a weathering agent, a compatibilizer, an impact improver, a modifier, or the like according to the purpose.

Specific examples of the flame retardant include a phosphorus type stabilizer, a halogen type flame retardant and metal hydroxide as mentioned above. In order to improve the flame retardancy, the composite material may contain a resin such as an ethylene-based copolymer including an ethylene-vinyl acetate copolymer and an ethyl acrylate copolymer.

Examples of the phosphorus type flame retardant include a compound containing a phosphorus atom in a molecule. Specific examples thereof include red phosphorus, phosphorous oxide such as phosphorus trioxide, phosphorus tetroxide and phosphorus pentoxide; a phosphoric acid compound such as phosphoric acid, phosphorous acid, hypophosphoric acid, metaphosphoric acid, pyrophosphoric acid and polyphosphoric acid; ammonium phosphate such as monoammonium phosphate, diammonium phosphate and ammonium polyphosphate; melamine phosphate such as melamine monophosphate, melamine diphosphate and melamine polyphosphate; metal phosphate including lithium phosphate, sodium phosphate, potassium phosphate, calcium phosphate and magnesium phosphate; aliphatic phosphoric acid esters; and aromatic phosphoric acid esters.

Specific examples of the halogen type flame retardant include aliphatic hydrocarbon bromide such as hexabromocyclododecane; aromatic compound bromide such as hexabromobenzene, ethylenebispentabromodiphenyl and 2,3-dibromopropylpentabromo phenyl ether; brominated bisphenols and a derivative thereof; a brominated bisphenols derivative oligomer; a bromide type aromatic compound; chlorinated paraffin; chlorinated naphthalene; perchloropentadecane; tetrachlorophthalic anhydride; a chlorinated aromatic compound; a chlorinated alicyclic compound; and a bromide type flame retardant such as hexabromophenyl ether and decabromodiphenyl ether.

Specific examples of the metal hydroxide include magnesium hydroxide and aluminum hydroxide. Moreover, a material obtained by applying surface treatment to the metal hydroxide described above can also be used.

Specific examples of the antioxidant, the stabilizer and the weathering agent include a hindered phenol antioxidant such as tetrakis[methylene-3-(3,5-di-t-butyl-4-hydroxyphenyl) propionate]methane, 1,3,5-trimethyl-2,4,6-tris(3,5-di-t-butyl-4-hydroxybenzyl)benzene and 4,4'-thiobis(3-methyl-6-t-butylphenol); and a hindered amine compound such as polymethylpropyl 3-oxy-[4(2,2,6,6-tetramethyl)piperidine]siloxane, polyester of 4-hydoxy-2,2,6,6-tetramethyl-1-piperidine ethanol with succinic acid, poly[{6-(1,1,3,3-tetramethylbutyl)amino-1,3,5-triazine-2,4-diyl}{(2,2,6,6-tetramethyl-4-piperidyl)imino}hexamethylene {(2,2,6,6-tetramethyl-4-piperidyl)imino}]. A content of the antioxidant, the stabilizer or the weathering agent is preferably 0.001 mass part to 0.3 mass part, each based on 100 mass parts of the composite material, and is appropriately adjusted depending on a kind of the antioxidant, the stabilizer or the weathering agent and an application of the composite material.

Specific examples of the compatibilizer, the impact improver and the modifier include a styrene-based elastomer such as polystyrene-poly(ethylene-ethylene/propylene) block-polystyrene, polystyrene-poly(ethylene/butylene) block-polystyrene, polystyrene-poly(ethylene/propylene) block-polystyrene and an olefin crystalline ethylene-butylene-olefin crystalline block polymer; acid-modified polyolefin such as maleic acid-modified polyethylene and maleic acid-modified polypropylene. From a viewpoint of enhancing the tensile strength and the flexural strength, maleic acid-modified polyethylene can be preferably used.

The composite material of the present invention can contain an oil component or various additives for improving processability. Specific examples thereof include paraffin, modified polyethylene wax, stearate, hydroxy stearate, a vinylidene fluoride-based copolymer such as a vinylidene fluoride-hexafluoropropylene copolymer, and organic-modified siloxane.

The composite material of the present invention can also contain carbon black, various pigments and dyes. The composite material of the present invention can also contain a metallic luster colorant. In this case, aluminum which may be contained in the composite material of the present invention may act thereon in a direction of further enhancing metallic luster by the metallic luster colorant.

The composite material of the present invention can also contain an electrical conductivity-imparting component such as electrically conductive carbon black other than aluminum. In this case, aluminum which may be contained in the composite material of the present invention may act thereon in a direction of further enhancing electrical conductivity by the electrical conductivity-imparting component.

The composite material of the present invention can also contain a thermal conductivity-imparting component other than aluminum. In this case, aluminum which may be contained in the composite material of the present invention may act thereon in a direction of further enhancing thermal conductivity by the thermal conductivity-imparting component.

The composite material of the present invention may be a foam. That is, the composite material of the present invention may be in a foamed state by action of a foaming agent. Examples of the foaming agent include an organic or inorganic chemical foaming agent, and specific examples include azodicarbonamide.

The composite material of the present invention may be crosslinked. Examples of the crosslinking agent include organic peroxide, and specific examples include dicumyl peroxide. The composite material of the present invention may be in a crosslinked form by a silane crosslinking method.

The formed body of the present invention can be obtained by using the composite material of the present invention. In the formed body of the present invention, the cellulose fiber, and if necessary the aluminum, are dispersed in the polyolefin resin in a uniform state. Therefore, the formed body is high in homogeneity, and excellent in shape stability, and also excellent in the flexural strength and the impact resistance, and can be used in for many purposes.

The formed body of the present invention can also be used in a pellet form (forming material).

Subsequently, with regard to the production method for the composite material of the present invention, a preferable embodiment will be described below, but the composite material of the present invention is not limited to the material obtained by the method described below. In addition, the preferable embodiment of the production method for the composite material of the present invention as described below is also referred to as "production method of the present invention".

[Production Method for Composite Material]

The production method of the present invention contains any of the following steps (I) to (V).

(I) Melt-kneading a cellulose-fiber-adhering polyolefin thin film piece in the presence of water, subsequently mixing this melt-kneaded product with a polypropylene resin, and kneading the mixture.

In the cellulose-fiber-adhering polyolefin thin film piece, the amount of the cellulose fiber is smaller than the amount of the polyolefin resin as an average of the dry mass ratio.

(II) Mixing a cellulose-fiber-adhering polyolefin thin film piece and a polypropylene resin, and melt-kneading the mixture in the presence of water.

In the cellulose-fiber-adhering polyolefin thin film piece, the amount of the cellulose fiber is smaller than the amount of the polyolefin resin as an average of the dry mass ratio.

(III) Melt-kneading a polyolefin laminated paper and/or a beverage/food pack formed from this polyolefin laminated paper in the presence of water, subsequently mixing this melt-kneaded product with a polypropylene resin, and kneading the mixture.

(IV) Mixing a polyolefin laminated paper and/or a beverage/food pack formed from this polyolefin laminated paper with a polypropylene resin, and melt-kneading the mixture in the presence of water.

(V) Mixing a cellulose material with a polypropylene resin, and melt-kneading the mixture in the presence of water.

<Melt-Kneading>

In the production method of the present invention, the melt-kneading in the steps (I) to (V) is carried out using a batch type closed kneading device having a stirring blade in the presence of water, by satisfying the following conditions (i) and/or (ii).

(i) The highest end-point temperature of melt-kneading is 280° C. or lower.

(ii) The ratio of the Z average molecular weight Mz with respect to the weight average molecular weight Mw of the resulting composite material satisfies the expression: $Mz/Mw \geq 4$.

Here, a term "melt-kneading" means to conduct the kneading at a temperature at which the polyolefin resin in the raw material is melted. The melt-kneading is preferably performed at a temperature at which the cellulose fiber is not deteriorated. An expression "the cellulose fiber is not deteriorated" means that the cellulose fiber does not cause significant discoloration, burning or carbonization.

A temperature in the above-described melt-kneading (temperature of the melt-kneaded material) is preferably adjusted to 110 to 280° C., and further preferably 130 to 220° C.

When melt-kneading is performed in the presence of water, a solid fixed state or a thermally fused state of cellulose fibers can be efficiently loosened by loading of shear force and the action of hot water (including physical action and chemical action (hydrolysis action) by hot water), and for example, the network-like entanglement between cellulose fibers can also be effectively loosened. Thus, cellulose fibers can be uniformly dispersed in the polyolefin resin.

In a case where the raw material to be melt-kneaded includes aluminum, hot water also acts on aluminum, and production of hydrated oxide on the surface of aluminum or dissolution of the surface is accelerated. In particular, when a hydrogen ion concentration (pH) is shifted from the neutrality, dissolution action increases. It is considered that the shear force by the melt-kneading and a reaction of the hot water with aluminum act thereon in a multiple manner, aluminum is sufficiently micronized, and the composite material having uniform physical properties can be obtained. Moreover, in micronization of aluminum and formation of hydrated oxide on the surface thereof to be promoted by the shear force and the hot water, accordingly as the aluminum is further micronized, the surface area increases, resulting in increasing an amount of the hydrated oxide on the surface of aluminum. It is considered that this phenomenon advantageously works also in improving the flame retardancy of the composite material.

When the cellulose-fiber-adhering polyolefin thin film piece is used as the raw material of the composite material, pH of water (hot water) ordinarily shows a value on an alkaline side in a state of performing the melt-kneading as described above. The pH of water in the state of performing the melt-kneading is preferably in the range of 7.5 to 10, and also preferably in the range of 7.5 to 9. When the water shows alkalinity, the aluminum and the water react with each other and the aluminum is easily dissolved thereinto, and uniform dispersibility in the polyolefin resin can be further enhanced.

Moreover, in the state of performing the melt-kneading as described above, the pH of the water may be adjusted to a value on an acid side (preferably pH to 4 to 6.5, and further preferably pH to 5 to 6.5). Also in this case, the aluminum and the water react with each other and the aluminum is easily dissolved thereinto, and the uniform dispersibility in the polyolefin resin can be further enhanced. However, when the pH is on the acid side, particularly a metal part of a melt-kneading device or each device used for production may be damaged. From this point, the pH showing the value on the alkaline side is preferable.

The hot water may be turned into water in the subcritical state. Here, "water in the subcritical state" means water which is in a high temperature and high pressure state, and does not reach a critical point of water (temperature: 374° C. and pressure: 22 MPa), and more specifically, is in a state in which the temperature is equal to or more than a boiling point (100° C.) of water, the temperature and the pressure each are equal to or less than the critical point of water, and the pressure is at least near a saturated water vapor pressure.

In the water in the subcritical state, an ionic product becomes larger than the ionic product of water under an atmospheric pressure at 0° C. or more and 100° C. or less, and it is assumed that the water in the subcritical state causes weakening of intermolecular bonding of the cellulose fibers, and defibration of the cellulose fibers is promoted. Moreover, it is considered that the water in the subcritical state has higher reactivity with the aluminum and can further enhance the micronization and the uniform dispersibility of the aluminum.

Melt-kneading using a batch type closed kneading device having a stirring blade can perform melt-kneading at an increased temperature in a space by, for example, introducing raw materials including cellulose fibers and a polyolefin resin, and water into a closed space, and vigorously kneading the raw materials and water by rotating the stirring blade at a high speed within such a closed space. In addition, a term "closed" in the present invention is used in the meaning of a space which is closed from outside, but is not in a completely closed state. That is, as described above, the closed space means the space provided with a mechanism according to which, when the raw material and water are intensively kneaded in the closed space, the temperature and the pressure rise, but the vapor is discharged to outside under such a high temperature and a pressure. Accordingly, while the melt-kneading in the presence of water is achieved by intensively kneading the raw material and water in the closed space, the moisture is continuously discharged to outside as the vapor. Therefore, the moisture can be finally significantly reduced, or can be substantially completely removed.

When the cellulose-fiber-adhering polyolefin thin film piece is used as the raw material, as mentioned above, this raw material contains a large amount of water upon separation treatment with the paper portion, and has been hard to be recycled also when consumed energy required for recycling or the like is taken into consideration. However, according to the production method of the present invention, water is necessary in order to melt knead the thin film piece in the presence of water. Accordingly, the large amount of absorbed water in the thin film piece does not matter at all, and rather there is an advantage of capability of reducing a labor hour of adding the water thereto. Furthermore, the moisture can be effectively discharged therefrom as high temperature vapor in the melt-kneading. Therefore, the moisture content of the composite material obtained can be reduced to a desired level.

As the above-mentioned batch type closed kneading device having a stirring blade, for example, a batch type high-speed agitating device including a cylindrical agitating chamber and having a structure in which a plurality of stirring blades is provided to protrude on the outer periphery of the rotary shaft that is disposed to pass through the interior of the agitating chamber, can be used. Moreover, for example, this batch type high-speed agitating device is provided with a mechanism according to which water vapor is released while the pressure in the agitation chamber is retained.

The temperature and pressure in the agitating chamber rapidly increase when high shear force is added to the raw materials and water by the rotating stirring blades, the water having high temperature acts physically and chemically (hydrolysis) on cellulose and defibrates the cellulose fibers in cooperation with strong shear force caused by high-speed stirring. Furthermore, in a case where the raw materials include aluminum, a reaction between the hot water and aluminum occurs, and it is considered that a composite material having a uniform composition or physical properties can be obtained.

As described above, the above-described batch type closed kneading device is provided with the cylindrical agitation chamber, and the plurality of stirring blades (for example, 4 to 8 blades) are projected on the outer periphery of the rotary shaft arranged by passing through the agitation chamber. The rotary shaft on which the stirring blades are arranged is connected to a motor being a drive source. Here, the temperature and the pressure are measured by a thermometer and a pressure gauge attached inside the agitation chamber, a melted state of the material is judged by using the temperature and the pressure measured from the thermometer and the pressure gauge, and the melt-kneading can be judged. Moreover, the melted state can also be judged by measuring rotating torque applied to the motor, without judging from the temperature and the pressure. For example, an end time point of the melt-kneading can also be judged by measuring a change in the rotating torque of the rotary shaft to be measured from a torque meter. In the melt-kneading, the stirring blades are rotated with a high speed. A peripheral speed (rotating speed) of the stirring blade is preferably 10 m/sec or more, and further preferably 20 to 50 m/sec as a peripheral speed at a leading edge of the stirring blade (leading edge portion farthest from the rotary shaft).

The end time point of the melt-kneading using the batch type closed kneading device can be appropriately adjusted by taking the physical properties of the composite material to be obtained into consideration. Preferably, it is preferable to stop rotation of the rotary shaft of the batch type closed kneading device within 30 seconds from a time point at which the rotating torque of the rotary shaft rises and reaches a maximum value and then falls, and a torque change rate reaches 5% or less per one second. Thus, the melt flow rate (MFR: temperature=230° C.; load=5 kgf) of the composite material to be obtained is easily adjusted to 0.05 to 50.0 g/10 min, and the physical properties can be further improved. In the composite material having the melt flow rate within the above-described range, the cellulose fibers are uniformly dispersed in the resin, the composite material is preferable for extrusion molding or injection molding, and a formed body having high shape stability, high strength, and high impact resistance can be prepared.

The reason why the melt flow rate of the composite material can be adjusted by controlling the end time point of the melt-kneading is estimated, as a contributory factor, that a part of the molecules of the polyolefin resin and the cellulose fiber is decomposed into low-molecular weight components by action of the hot water and the water in the subcritical state produced during the melt-kneading.

In the present description, a term "torque change rate reaches 5% per one second" means that torque T1 at a predetermined time and torque T2 after one second from the predetermined time satisfies the following expression (T):

$$100\times(T1-T2)/T1 \leq 5(\%). \qquad \text{Expression (T):}$$

In particularly, in the steps (I) and (II), when the raw material and water are charged into the batch type closed kneading device, the raw material may be pulverized or subjected to volume reduction treatment according to necessity and treated into the size and bulk density facilitating to perform self-weight fall charge or the like and handling. Here, "the volume reduction treatment" means treatment according to which the thin film piece is compressed to reduce a bulk volume, in which the moisture adhered to the thin film piece beyond necessity is also squeezed out by the compression on this occasion. The moisture adhered to the thin film piece beyond necessity can be squeezed out, and energy efficiency until the composite material is obtained can be further improved by applying the volume reduction treatment thereto.

In this cellulose-fiber-adhering polyolefin thin film piece obtained by the treatment using the pulper, the moisture content ordinarily reaches around 50 mass %, and the thin film piece is in a state in which a large amount of water is absorbed. In such a cellulose-fiber-adhering polyolefin thin film piece in the state of absorbing water, the moisture is squeezed by the volume reduction treatment, and the moisture content reaches around 20 mass %, for example. Moreover, an apparent volume is preferably adjusted to ½ to ⅕ by this volume reduction treatment. The device used in the volume reduction treatment is not particularly limited, but an extrusion system volume reduction machine having two screws is preferable. The thin film piece can be continuously treated, and simultaneously a volume-reduced material which is easily handled in a subsequent step, and is properly small in individual sizes can be obtained by using the extrusion system volume reduction machine having two screws. For example, DUAL PRETISER (model: DP-3N, manufactured by Oguma Iron Works Co., Inc.) or the like can be used.

Moreover, the cellulose-fiber-adhering polyolefin thin film piece in the state of absorbing water is pulverized, and this pulverized material can also be melt kneaded. Pulverizing treatment can be performed by using a pulverizer having a rotary blade, a pulverizer having a rotary blade and a fixed blade, and a pulverizer having a sliding blade, for example.

As the water to be used upon the melt-kneading, as described above, cellulose fiber-impregnated water adhered to the cellulose-fiber-adhering polyolefin thin film piece, or water adhered to the surface of the thin film piece, or the like can be directly used. Furthermore, in a case where the raw materials are not in a state of having absorbed water, a necessary amount of water may be added.

The amount of water necessary upon the melt-kneading is ordinarily 5 mass parts or more and less than 150 mass parts based on 100 mass parts of the cellulose fiber. The composite material in which the cellulose fibers are uniformly dispersed in the resin, the moisture content is less than 1 mass %, and has excellent moldability is easily produced by adjusting the water to this range of the amount of water. The amount of water upon the melt-kneading is further preferably 5 to 120 mass parts, still further preferably 5 to 100 mass parts, still further preferably 5 to 80 mass parts, and still further preferably adjusted to 10 to 25 mass parts, based on 100 mass parts of the cellulose fiber.

According to the production method of the present invention, in performing the melt-kneading, a cellulose material can be further mixed therein.

In this case, a blending amount of the cellulose material is preferably adjusted in such a manner that a proportion of the cellulose fiber becomes 1 mass part or more and 70 mass parts or less, further preferably 5 mass parts or more and 70 mass parts or less, still further preferably 5 mass parts or more and less than 50 mass parts, and particularly preferably 25 mass parts or more and less than 50 mass parts, in the total content of 100 mass parts of the polyolefin resin and the cellulose fiber in the composite material obtained.

Examples of the cellulose material include a material mainly containing cellulose, and more specifically, specific examples thereof include paper, waste paper, paper powder, regenerated pulp, paper sludge and broken paper of laminated paper. Above all, in view of cost and effective use of resources, waste paper and/or paper sludge is preferably used, and paper sludge is further preferably used. This paper sludge may contain an inorganic material in addition to the cellulose fiber. From a viewpoint of enhancing elastic modulus of the composite material, paper sludge containing an inorganic material is preferable. Moreover, when impact strength of the composite material is emphasized, as the paper sludge, a material without containing an inorganic material, or a material having a small content, even if the material contains the inorganic material, is preferable. When the paper such as the waste paper is mixed therein, the paper is preferably wetted with the water in advance before the melt-kneading. The composite material in which the cellulose fibers are uniformly dispersed in the resin is easily obtained by using the paper wetted with the water.

According to the production method of the present invention, in a case where a beverage pack and/or a food pack, or a cellulose-fiber-adhering polyolefin thin film piece obtainable by treating these with a pulper is used as a raw material, as the beverage pack or food pack, a used pack or an unused pack can be utilized. When the used beverage pack or food pack is recovered and used, a resin component other than the polyolefin resin is mixed in the recovered material in several cases. In particular, mixing of polyethylene terephthalate, nylon, and the like may be exemplified. The composite material obtained by the production method of the present invention can contain such a resin other than the polyolefin resin. The composite material obtained by the production method of the present invention can contain polyethylene terephthalate and/or nylon in a total amount of 10 mass parts or less based on the total content of 100 mass parts of the polyolefin resin and the cellulose fiber, for example.

In the steps (I) and (III) according to the production method of the present invention, a melt-kneaded product is mixed with a polypropylene resin, and the mixture is kneaded. This kneading can be carried out using a kneading machine such as a twin-screw extruder, a kneader, or a Banbury mixer. Furthermore, this kneading is usually carried out without adding water.

The production method of the present invention is also useful as a method for recycling a polyolefin laminated paper, or a beverage pack and/or a food pack formed from a polyolefin laminated paper, as a resin material of a resin product.

EXAMPLES

The present invention will be described in more detail based on examples given below, but the invention is not meant to be limited by these.

First, a measuring method and an evaluation method for each indicator in the present invention will be described.

[Shape of Resulting Material (Cellulose-Aluminum-Dispersing Polyolefin Resin Composite Material)]

An appearance of a cellulose-fiber-dispersing polyolefin resin composite material after kneading was evaluated through visual inspection. A material in a state of bulk was deemed as a conformance product (○); and a material in a powder shape having a particle size of 2 mm or less, or a material which was significantly ignited after kneading was deemed as a nonconformance product (x). The material in the powder shape causes bridging or adhesion to a vessel wall surface for the reason of easily absorbing moisture in air due to small bulk density, and is difficult in charging into a molding machine by self-weight fall upon subsequent molding.

In the present Example, all composite materials obtained by the production method of the present invention fall under the above-described conformance product.

[Impact Resistance]

A test piece (thickness: 4 mm, width: 10 mm, and length: 80 mm) was prepared by injection molding, and Izod impact strength was measured using a notched test piece in accordance with JIS K 7110. A unit of the impact resistance is "$kJ/m^2$".

[Impact Resistance after Immersion]

A test piece (thickness: 4 mm, width: 10 mm, and length: 80 mm) was prepared by injection molding. This test piece was immersed in water at 23° C. for 20 days and then taken off, and the surface water was wiped off. Within 3 hours, Izod impact strength was measured using a notched test piece in accordance with JIS K 7110. A unit of the impact resistance is "$kJ/m^2$".

[Cellulose Effective Mass Ratio]

A sample (10 mg) formed in a dry state by drying the composite material sample at 80° C. for 1 hour in advance in an ambient atmosphere was used, and based on the results obtained by performing a thermogravimetric analysis (TGA) from 23° C. to 400° C. at a heating rate of +10° C./min under a nitrogen atmosphere, a cellulose effective mass ratio was determined according to the following formula. Measurement was performed 5 times and an average value thereof was determined, and the average value was taken as the cellulose effective mass ratio.

(Cellulose effective mass ratio [%])=(loss of mass [mg] from 270° C. to 390° C. of the composite material sample)×100/(mass [mg] of the composite material sample in a dry state before being provided for the thermogravimetric analysis)

[Water Absorption Ratio]

A composite material which was dried by a hot air dryer at 80° C. in advance until a moisture content was reduced to 0.5 mass % or less was molded into a sheet form having a dimension of 100 mm×100 mm×1 mm by a press to obtain a formed body, and this formed body was immersed into water of 23° C. for 20 days, and based on measured mass values before and after the immersion, water absorption ratio was determined according to the following [Formula A] (in which, upon measuring mass after the immersion, water drops adhered on the surface was wiped off with dry cloth or filter paper.).

With regard to conformance or nonconformance, a case where calculated water absorption ratio satisfies the following evaluation expression [Formula B] was deemed as conformance (○), and a case where the calculated water absorption ratio does not satisfy the expression was deemed as nonconformance (x).

(Water absorption ratio [%])=(mass after immersion [g]−mass before immersion [g])×100/(mass before immersion [g])  [Formula A]:

(Water absorption ratio)<(cellulose effective mass ratio)$^2$×0.01  [Formula B]:

[Cellulose Fiber Dispersibility]

A composite material which was dried by a hot air dryer at 80° C. in advance until a moisture content was reduced to 0.5 mass % or less was molded into a sheet form having a dimension of 100 mm×100 mm×1 mm by a press to obtain a formed body. This formed body was immersed into water at 80° C. for 20 days, and then a square having a size of 40 mm×40 mm was drawn in an arbitrary place on a surface of the formed body removed from warm water, and further 9 line segments having a length of 40 mm were drawn inside the square at an interval of 4 mm. Roughness on an intermediate line between adjacent two line segments was measured under conditions of cut-off value λc=8.0 mm and λs=25.0 μm by using a surface roughness measuring instrument to obtain 10 lines of roughness curves (specified by JIS B 0601; evaluation length: 40 mm). When the number of mountains having a peak top of 30 μm or more and being convex upward (from the surface toward an outside) was counted in all of 10 lines of the roughness curves, a case where the number of mountains is 20 or more in total was deemed as a nonconformance product (x), and a case where the number of mountains is less than 20 was deemed as a conformance product (○).

In a case where cellulose fibers are unevenly distributed in a sample, since water absorption occurs locally, and the surface of that portion swells, the number of peaks increases. In a case where cellulose fibers are uniformly dispersed, since the number of peaks reaches a predetermined value or less, dispersibility of cellulose fibers can be evaluated using this method by setting, for example, a predetermined number of peaks of 20 as the threshold.

[Molecular Weight Pattern]

To 16 mg of composite material, 5 mL of a solvent (1,2,4-trichlorobenzene) for GPC measurement was added, and the resulting mixture was stirred at 160° C. to 170° C. for 30 minutes. An insoluble matter was removed by filtration with a metal filter having a pore of 0.5 μm, and GPC was measured on the thus obtained sample (soluble matter) after filtration by using a GPC system (PL220, manufactured by Polymer Laboratories, Inc., model: HT-GPC-2), using, as columns, Shodex HT-G (one) and HT-806M (two), setting a column temperature to 145° C., using 1,2,4-trichlorobenzene as an eluant, at a flow rate of 1.0 mL/min, and injecting 0.2 mL of the sample thereinto. Thus, a molecular weight pattern was obtained by using monodisperse polystyrene (manufactured by Tosoh Corporation), and dibenzyl (manufactured by Tokyo Chemical Industry Co., Ltd.) as standard samples to prepare a calibration curve, and performing data processing by a GPC data processing system (manufactured by TRC).

In the molecular weight pattern obtained by the GPC measurement, Mw is the weight-average molecular weight and Mz is the Z-average molecular weight.

Mw (weight-average molecular weight) and Mz (Z-average molecular weight) are defined by the following formula.

$$Mw=\Sigma(Ni \cdot Mi^2)/\Sigma(Ni \cdot Mi)$$

$$Mz=\Sigma(Ni \cdot Mi^3)/(Ni \cdot Mi^2)$$

Herein, Mi is the molecular weight and Ni is the number of molecules.

In the molecular weight pattern, a pattern satisfying the following (A) was deemed as a conformance pattern (○), and a pattern not satisfying the following (A) was deemed as a nonconformance pattern (x).

$$Mz/Mw \geq 4 \quad (A)$$

In addition, in the present Example, in all of the polyolefin resins composing the composite material of the present invention, Mw is in the range of 400,000 to 1,000,000.

[Particle Size Distribution of Aluminum (Judgment of Aluminum Length)]

A composite material was pressed to obtain a 1 mm-thick sheet-form formed body. A proportion (%) of the number of aluminum having an X-Y maximum length of 1 mm or more in the number of aluminum having an X-Y maximum length of 0.005 mm or more was determined by photographing an enlarged photograph of a surface of this formed body by using a microscope, and determining, on aluminum existing in the range of 5.1 mm×4.2 mm, a distribution of X-Y maximum length thereof by using image analysis software. A case where the proportion of aluminum having the X-Y maximum length of 1 mm or more therein is less than 1% was deemed as (○), and a case other than (○) was deemed as (Δ). Among the cases of (Δ), a case where aluminum having an X-Y maximum length of 5 mm or more was deemed as (x). As the image analysis software, "Simple image dimension measuring software Pixs2000_Pro" (manufactured by INNOTECH CORPORATION) was used. In addition, an average of the X-Y maximum length was within the range of 0.02 mm to 0.2 mm for all with regard to the materials in which judgment of the aluminum length was deemed as (○).

[Tensile Strength]

A test piece was prepared by injection molding, and tensile strength was measured on a No. 2 test piece in accordance with JIS K 7113. A unit is "MPa".

Meanwhile, all of the thus-obtained composite materials shown in Tables 1 to 3 have a moisture content of 1 mass % or less.

Test Example 1

Broken paper of a polyethylene laminated paper (having paper, a polyethylene thin film layer, and an aluminum thin film layer) was pulverized using a rotary blade type pulverizer (manufactured by Horai Co, Ltd.), and this was mixed with polypropylene 1 (BC6, manufactured by Japan Polypropylene Corporation) and water, at the blending ratios shown in Table 1-1. This mixture was charged into a batch type closed kneading device (batch type high-speed agitating device), and the mixture was melt kneaded in the presence of water by performing agitation with a high speed by adjusting a rotating speed of an stirring blade of the device to 40 m/sec in a peripheral speed at a leading edge of the stirring blade, to prepare a cellulose-fiber-dispersing polyolefin resin composite material.

In addition, with regard to an end of kneading, a time point at which a temperature of the material in a device chamber to be measured by a thermometer installed in the batch type kneading device reached the temperature shown in Table 1-2 was taken as the end.

The cellulose effective mass ratio (%) and the content of the polyolefin resin (%) in each composite material determined in the above-mentioned method are shown in the upper part of Table 1-2. Furthermore, the amounts (mass parts) of various components when the total amount of the cellulose fiber and the polyolefin rein was designated as 100 mass parts, which were calculated by the above-described method using the cellulose effective mass ratio (%) and the content (mass %) of the polyolefin resin, are shown in the middle part of Table 1-2. Further, the evaluation results are shown in the bottom part of Table 1-2.

TABLE 1-1

|  | Example 1 | Example 2 | Comparative Example 1 | Comparative Example 2 |
|---|---|---|---|---|
| Polypropylene 1 (mass parts) | 70 | 70 | 70 | 70 |
| Broken paper of laminated paper (mass parts) | 30 | 30 | 30 | 30 |
| Water (mass parts) | 100 | 100 | 100 | 0 |

TABLE 1-2

|  | Example 1 | Example 2 | Comparative Example 1 | Comparative Example 2 |
|---|---|---|---|---|
| Cellulose effective mass ratio (%) | 14.6 | 13.9 | 14.2 | — |
| Content of polyolefin resin (mass %) | 77.7 | 78.6 | 78.0 | — |
| Cellulose fiber (mass parts) | 15.8 | 15.0 | 15.4 | — |
| Polyolefin resin (mass parts) | 84.2 | 85.0 | 84.6 | — |
| PP (mass parts) | 75.9 | 75.6 | 75.9 | — |
| PE [resin derived from broken paper of laminated paper] (mass parts) | 8.3 | 9.4 | 8.7 | — |
| Aluminum, ash (mass parts) | 8.4 | 8.1 | 8.4 | — |
| Temperature of material (discharge temperature, ° C.) | 180 | 240 | 300 | — |
| Shape of resulting material | ○ | ○ | ○ | x |
| Tensile strength (MPa) | 37.7 | 34.3 | 29.4 | — |
| Impact strength (kJ/m$^2$) | 5.5 | 5.3 | 4.6 | — |
| Conformance or nonconformance of aluminum length | ○ | ○ | ○ | x |
| Cellulose fiber dispersibility | ○ | ○ | ○ | x |
| Impact resistance after immersion (kJ/m$^2$) | 9.2 | 8.3 | 6.1 | — |
| Z-average molecular weight/Weight-average molecular weight | 4.6 | 4.2 | 3.8 | — |
| Molecular weight pattern | ○ | ○ | x | — |
| Weight-average molecular weight | 623000 | 567000 | 318000 | — |

As shown in Table 1-2, when the material temperature increased to 300° C. during melt-kneading, since the molecular weight pattern of the resin composing the resulting composite material did not satisfy the expression "Mz/Mw≥4", and the high molecular weight component could not be maintained at a predetermined level, this composite material had poor mechanical strength (Comparative Example 1).

Further, when the melt kneading was performed without adding water, any composite material could not be obtained in the form of lumps (Comparative Example 2).

In contrast, when the highest end-point temperature was lowered to a certain extent and melt-kneading was performed in the presence of water, the molecular weight pattern satisfied the expression "Mz/Mw≥4". As such, with respect to a composite material in which the decrease in the high molecular weight component is suppressed to a predetermined level exhibits, a molded article obtained by injection molding this composite material also had excellent mechanical strength (Examples 1 and 2).

Test Example 2

Without using the broken paper of the polyethylene laminated paper, paper 1 (tray paper), polypropylene 1 and water were blended at the blending ratio shown in Table 2-1. Thus-obtained mixture was charged into a batch type closed kneading device (batch type high-speed agitating device), and the mixture was melt kneaded in the presence of water by performing agitation with a high speed by adjusting a rotating speed of an stirring blade of the device to 40 m/sec in a peripheral speed at a leading edge of the stirring blade, to prepare a cellulose-fiber-dispersing polyolefin resin composite material.

In addition, with regard to an end of kneading, a time point at which a temperature of the material in a device chamber to be measured by a thermometer installed in the batch type kneading device reached the temperature shown in Table 2-2 was taken as the end.

The cellulose effective mass ratio (%) and the content of the polyolefin resin (mass %) in each composite material determined in the above-mentioned method are shown in the upper part of Table 2-2. Furthermore, the amounts (mass parts) of various components when the total amount of the cellulose fiber and the polyolefin rein was designated as 100 mass parts, which were calculated by the above-described method using the cellulose effective mass ratio (%) and the content (%) of the polyolefin resin, are shown in the middle part of Table 2-2. Further, the evaluation results are shown in the bottom part of Table 2-2.

mined level exhibits suppressed water absorption ratio, and a molded article obtained by injection molding this composite material also had excellent mechanical strength (Examples 3 and 4).

Test Example 3

Broken paper of a polyethylene laminated paper (having paper, a polyethylene thin film layer, and an aluminum thin film layer) was pulverized using a rotary blade type pulverizer (manufactured by Horai Co, Ltd.), and this was mixed with the above-described polypropylene 1, at the blending ratios shown in Table 3-1. The thus-obtained mixture was charged into the twin screw extruder (TEX30, manufactured by Japan Steel Works, Ltd.) to prepare a cellulose-fiber-dispersing polyolefin resin composite material.

The results are shown in Table 3-2.

TABLE 2-1

|  | Example 3 | Example 4 | Comparative Example 3 | Comparative Example 4 |
|---|---|---|---|---|
| Polypropylene 1 (mass parts) | 70 | 70 | 70 | 70 |
| Paper 1 (mass parts) | 30 | 30 | 30 | 30 |
| Water (mass parts) | 100 | 100 | 100 | 0 |

TABLE 3-1

|  | Comparative Example 5 |
|---|---|
| Polypropylene 1 (mass parts) | 70 |
| Broken paper of laminated paper (mass parts) | 30 |
| Water (mass parts) | 0 |

TABLE 2-2

|  | Example 3 | Example 4 | Comparative Example 3 | Comparative Example 4 |
|---|---|---|---|---|
| Cellulose effective mass ratio (%) | 22.8 | 22.7 | 22.4 | 22.5 |
| Content of polyolefin resin (%) | 63.5 | 63.2 | 63.1 | 63.6 |
| Cellulose fiber (mass parts) | 26.4 | 26.4 | 26.2 | 26.1 |
| Polyolefin resin (mass parts) | 73.6 | 73.6 | 73.8 | 73.9 |
| Temperature of material (discharge temperature, °C.) | 180 | 240 | 300 | — |
| Shape of resulting material | ○ | ○ | ○ | x |
| Tensile strength (MPa) | 40.5 | 38.3 | 32.8 | — |
| Water absorption ratio (%) | 2.4 | 2.6 | 3.9 | 6.9 |
| Conformance or nonconformance of water absorption ratio | ○ | ○ | ○ | x |
| Cellulose fiber dispersibility | ○ | ○ | ○ | x |
| Z-average molecular weight/Weight-average molecular weight | 4.4 | 4.3 | 3.9 | — |
| Molecular weight pattern | ○ | ○ | x | — |
| Weight-average molecular weight | 643000 | 615000 | 371000 | — |

As shown in Table 2-2, when the material temperature increased to 300° C. during melt-kneading, since the molecular weight pattern of the resin composing the resulting composite material did not satisfy the expression "Mz/Mw≥4", and the high molecular weight component could not be maintained at a predetermined level, this composite material had poor mechanical strength (Comparative Example 3).

Further, when the melt kneading was performed without adding water, any composite material could not be obtained in the form of lumps (Comparative Example 4).

In contrast, when the highest end-point temperature was lowered to a certain extent and melt-kneading was performed in the presence of water, the molecular weight pattern satisfied the expression "Mz/Mw≥4". As such, a composite material in which the decrease in the high molecular weight component is suppressed to a predeter-

TABLE 3-2

|  | Comparative Example 5 |
|---|---|
| Cellulose effective mass ratio (%) | 15.1 |
| Content of polyolefin resin (%) | 77.7 |
| Cellulose fiber (mass parts) | 16.3 |
| Polyolefin resin (mass parts) | 83.7 |
| Aluminum, ash (mass parts) | 7.8 |
| Shape of resulting material | ○ |
| Tensile strength (MPa) | 31.2 |
| Conformance or nonconformance of aluminum length | Δ |
| Dispersibility | x |
| Molecular weight pattern | x |

As shown in Table 3-2, in a case where melt-kneading was carried out using a twin-screw extruder, a lumpy composite material could be obtained. However, in the composite material, dispersibility of the cellulose fiber did not reach a desired level. Further, since the molecular weight pattern of the resin composing the resulting composite material did not satisfy the expression "Mz/Mw≥4", and the high molecular weight component could not be maintained at a predetermined level, this composite material also had poor mechanical strength (Comparative Example 5).

Having described our invention as related to the present embodiments, it is our intention that the invention not be limited by any of the details of the description, unless otherwise specified, but rather be construed broadly within its spirit and scope as set out in the accompanying claims.

The invention claimed is:

1. A cellulose-fiber-dispersing polyolefin resin composite material, comprising:
   a polyolefin resin containing a polypropylene resin; and
   a cellulose fiber dispersed in the polyolefin resin,
   wherein a proportion of the cellulose fiber is 5 mass part or more and less than 50 mass parts in a total content of 100 mass parts of the polyolefin resin and the cellulose fiber,
   wherein the polyolefin resin satisfies the expression: Mz/Mw≥4, which is a ratio of Z-average molecular weight Mz to weight-average molecular weight Mw to be obtained by a gel permeation chromatography measurement, and
   wherein the weight average molecular weight Mw is in the range of 400,000 or more and 1,000,000 or less.

2. A cellulose-fiber-dispersing polyolefin resin composite material, comprising:
   a polyolefin resin containing a polypropylene resin; and
   a cellulose fiber dispersed in the polyolefin resin,
   wherein a proportion of the cellulose fiber is 5 mass part or more and less than 50 mass parts in a total content of 100 mass parts of the polyolefin resin and the cellulose fiber,
   wherein the polyolefin resin satisfies the expression: Mz/Mw≥4, which is a ratio of Z-average molecular weight Mz to weight-average molecular weight Mw to be obtained by a gel permeation chromatography measurement, and
   wherein a melt flow rate (MFR) at a temperature of 230° C. and a load of 5 kgf is 0.05 to 50.0 g/10 min.

3. A cellulose-fiber-dispersing polyolefin resin composite material, comprising:
   a polyolefin resin containing a polypropylene resin; and
   a cellulose fiber dispersed in the polyolefin resin,
   wherein a proportion of the cellulose fiber is 5 mass part or more and less than 50 mass parts in a total content of 100 mass parts of the polyolefin resin and the cellulose fiber,
   wherein the polyolefin resin satisfies the expression: Mz/Mw≥4, which is a ratio of Z-average molecular weight Mz to weight-average molecular weight Mw to be obtained by a gel permeation chromatography measurement, and
   comprising aluminum dispersed in the polyolefin resin,
   wherein a content of the aluminum is 1 mass part or more and 40 mass parts or less based on a total content of 100 mass parts of the polyolefin resin and the cellulose fiber.

4. The cellulose-fiber-dispersing polyolefin resin composite material according to claim 3, wherein a proportion of the number of aluminum having an X-Y maximum length of 1 mm or more in the number of aluminum having an X-Y maximum length of 0.005 mm or more is less than 1%.

5. The cellulose-fiber-dispersing polyolefin resin composite material according to claim 1, comprising a cellulose fiber having a fiber length of 1 mm or more.

6. The cellulose-fiber-dispersing polyolefin resin composite material according to claim 1, wherein a proportion occupied by the polypropylene resin in the polyolefin resin is 50 mass % or more.

7. The cellulose-fiber-dispersing polyolefin resin composite material according to claim 1, wherein the cellulose-fiber-dispersing polyolefin resin composite material comprises an inorganic material, and a content of the inorganic material is 1 mass part or more and 100 mass parts or less based on 100 mass parts of the polyolefin resin.

8. The cellulose-fiber-dispersing polyolefin resin composite material according to claim 1, wherein, in the cellulose-fiber-dispersing polyolefin resin composite material, water absorption ratio after the cellulose-fiber-dispersing polyolefin resin composite material is immersed into water at 23° C. for 20 days is 0.1 to 10%, and impact resistance after the cellulose-fiber-dispersing polyolefin resin composite material is immersed into water at 23° C. for 20 days is higher than impact resistance before the cellulose-fiber-dispersing polyolefin resin composite material is immersed thereinto.

9. The cellulose-fiber-dispersing polyolefin resin composite material according to claim 1, wherein a moisture content is less than 1 mass %.

10. A pellet, which is produced by using the cellulose-fiber-dispersing polyolefin resin composite material according to claim 1.

11. A formed body, which is produced by using the cellulose-fiber-dispersing polyolefin resin composite material according to claim 1.

12. A method for producing the cellulose-fiber-dispersing polyolefin resin composite material according to claim 1, the method comprising any of the following steps (I) to (V);
    (I) melt-kneading a cellulose-fiber-adhering polyolefin thin film piece in the presence of water, subsequently mixing this melt-kneaded product with a polypropylene resin, and kneading the mixture, with the proviso that, in the cellulose-fiber-adhering polyolefin thin film piece, the amount of the cellulose fiber is smaller than the amount of the polyolefin resin as an average of the dry mass ratio;
    (II) mixing a cellulose-fiber-adhering polyolefin thin film piece and a polypropylene resin, and melt-kneading the mixture in the presence of water, with the proviso that, in the cellulose-fiber-adhering polyolefin thin film piece, the amount of the cellulose fiber is smaller than the amount of the polyolefin resin as an average of the dry mass ratio;
    (III) melt-kneading a polyolefin laminated paper and/or a beverage/food pack formed from this polyolefin laminated paper in the presence of water, subsequently mixing this melt-kneaded product with a polypropylene resin, and kneading the mixture;
    (IV) mixing a polyolefin laminated paper and/or a beverage/food pack formed from this polyolefin laminated paper with a polypropylene resin, and melt-kneading the mixture in the presence of water; and
    (V) mixing paper with a polypropylene resin, and melt-kneading the mixture in the presence of water;
    wherein the melt-kneading in the steps (I) to (V) is carried out using a batch type closed kneading device having a stirring blade while satisfying the following condition (i) and/or condition (ii):
    (i) the highest end-point temperature of melt-kneading is 280° C. or lower; and (ii) the ratio of the Z average molecular weight Mz with respect to the weight average molecular weight Mw of the resulting composite material satisfies the expression: Mz/Mw≥4.

13. The production method for a cellulose-fiber-dispersing polyolefin resin composite material according to claim 12, wherein the cellulose-fiber-adhering polyolefin thin film piece is a polyolefin thin film piece formed by cellulose fibers and aluminum adhering thereto, and the polyolefin laminated paper has an aluminum thin film layer.

14. The production method for a cellulose-fiber-dispersing polyolefin resin composite material according to claim 12, wherein the melt kneading is performed in the presence of water in a subcritical state.

15. The production method for a cellulose-fiber-dispersing polyolefin resin composite material according to claim 12, wherein the cellulose-fiber-dispersing polyolefin resin composite material comprises aluminum dispersed therein, and wherein, in the cellulose-fiber-dispersing polyolefin resin composite material, a proportion of the number of aluminum having an X-Y maximum length of 1 mm or more in the number of aluminum having an X-Y maximum length of 0.005 mm or more is less than 1%.

16. A pellet, which is produced by using the cellulose-fiber-dispersing polyolefin resin composite material according to claim 2.

17. A pellet, which is produced by using the cellulose-fiber-dispersing polyolefin resin composite material according to claim 3.

18. A formed body, which is produced by using the cellulose-fiber-dispersing polyolefin resin composite material according to claim 2.

19. A formed body, which is produced by using the cellulose-fiber-dispersing polyolefin resin composite material according to claim 3.

* * * * *